(12) United States Patent
Hsiao et al.

(10) Patent No.: US 12,554,835 B2
(45) Date of Patent: Feb. 17, 2026

(54) ALWAYS-ON ARTIFICIAL INTELLIGENCE (AI) SECURITY HARDWARE ASSISTED INPUT/OUTPUT SHAPE CHANGING

(71) Applicant: MEDIATEK INC., Hsinchu (TW)

(72) Inventors: Chih-Hsiang Hsiao, Hsinchu (TW); Hsu Chia-Feng, Hsinchu (TW); Ze-Yu Wang, Hsinchu (TW); Sushih Yong, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 308 days.

(21) Appl. No.: 18/332,346

(22) Filed: Jun. 9, 2023

(65) Prior Publication Data

US 2024/0411862 A1 Dec. 12, 2024

(51) Int. Cl.
*G06F 21/53* (2013.01)
*H04L 9/40* (2022.01)

(52) U.S. Cl.
CPC .......... *G06F 21/53* (2013.01); *H04L 63/0209* (2013.01)

(58) Field of Classification Search
None
See application file for complete search history.

(56) References Cited

U.S. PATENT DOCUMENTS

| | | | |
|---|---|---|---|
| 9,715,597 B2 * | 7/2017 | Smith | G06F 21/51 |
| 10,540,509 B2 | 1/2020 | Ashkenazi | |
| 10,762,198 B1 | 9/2020 | Dea | |
| 2021/0165883 A1 * | 6/2021 | Zhang | G06F 9/4411 |
| 2021/0232681 A1 | 7/2021 | Tsirkin | |
| 2022/0269796 A1 * | 8/2022 | Chase | G06F 21/32 |
| 2023/0097169 A1 * | 3/2023 | Dwivedi | G06F 18/29 |
| | | | 706/15 |

FOREIGN PATENT DOCUMENTS

TW 201826162 A 7/2018

* cited by examiner

*Primary Examiner* — Farid Homayounmehr
*Assistant Examiner* — Suman Debnath
(74) *Attorney, Agent, or Firm* — Winston Hsu

(57) ABSTRACT

Aspects of the present disclosure provide an apparatus that can execute an artificial intelligence (AI) model with IO changing. For example, the apparatus can include a first secured processor, a secured application embedded in the first secured processor and associated with an AI model, a secured memory configured to store an AI executable binary associated with the AI model, a second secured processor configured to execute the AI executable binary, a sub-system configured to trigger IO changing and trigger the second secured processor to execute the AI executable binary, IO meta data stored in the secured memory, an IO verifier configured to verify IO changing by determining the IO meta data, and an IO pre-fire module configured to patch the IO changing to the AI executable binary running on the second secured processor when the IO verifier determines that the IO changing matches the IO meta data.

10 Claims, 6 Drawing Sheets

ALWAYS-ON ARTIFICIAL INTELLIGENCE (AI) SECURITY HARDWARE ASSISTED INPUT/OUTPUT SHAPE CHANGING

TECHNICAL FIELD

The present disclosure relates to neural networks (NNs), and, more specifically, to always-on artificial intelligence (AI) security.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Machine learning (ML) function integrated to hardware path is trend, and a flexible and scalable design is required to reduce the design complexity of a deep neural network (DNN) accelerator implementation.

SUMMARY

Aspects of the present disclosure provide an apparatus that can execute an artificial intelligence (AI) model with IO changing. For example, the apparatus can include a first secured processor and a secured application embedded in the first secured processor. The secured application can be associated with an artificial intelligence (AI) model. The apparatus can also include a secured memory coupled to the first secured processor. The secured memory can be configured to store an AI executable binary that is associated with the AI model. The apparatus can also include a second secured processor coupled to the secured memory. The second secured processor can be configured to execute the AI executable binary stored in the secured memory. The apparatus can also include a sub-system coupled between the first secured processor and the second secured processor. The sub-system can be configured to trigger IO changing and trigger the second secured processor to execute the AI executable binary stored in the secured memory. The apparatus can also include IO meta data stored in the secured memory. The apparatus can also include an IO verifier coupled to the sub-system and the secured memory. The IO verifier can be configured to verify IO changing by determining the IO meta data. The apparatus can also include an IO pre-fire module coupled to the IO verifier. The IO pre-fire module can be configured to patch the IO changing to the AI executable binary running on the second secured processor when the IO verifier determines that the IO changing matches the IO meta data. In an embodiment, the IO verifier can be embedded in the second secured processor. In another embodiment, the IO pre-fire module can be embedded in the second secured processor.

In an embodiment, the IO meta data can include an IO address range, the IO changing can include an IO address, the IO verifier can verify whether the IO address is within the IO address range, and the IO pre-fire module can patch the IO address to the AI executable binary running on the second secured processor when the IO verifier determines that the IO address is within the IO address range. In another embodiment, the IO meta data can include a number of different resolutions, the IO changing can include resolution changing, the IO verifier can verify whether the resolution changing matches any one of the different resolutions specified in the IO meta data, and the IO pre-fire module can patch the resolution changing to the AI executable binary running on the second secured processor when the IO verifier determines that the resolution changing matches one of the different resolutions.

In an embodiment, the apparatus can further include a secure operating system (OS) embedded in the first secured processor, the secure OS configured to provide a trusted execution environment (TEE) within which the secured application is protected. In another embodiment, the secured memory and the second secured processor can be protected by a first firewall. In some embodiments, the sub-system can be protected by a second firewall different from the first firewall. In various embodiments, the first firewall can provide a higher security level than the second firewall.

In an embodiment, the apparatus can further include an image signal processor (ISP) coupled to the secured memory. The ISP can be configured to process images and store the processed images into the secured memory. In another embodiment, the apparatus can further include a facial biometric pattern secured within the TEE. In some embodiments, the second secured processor can execute the AI executable binary to determine whether any one of the processed images matches the facial biometric pattern.

In an embodiment, the first secured processor can include a secured central processing unit (CPU). In another embodiment, the second secured processor can include a secured deep learning accelerator (DLA). In some embodiments, the DLA can include an accelerated processing unit (APU).

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Ambient intelligence (AmI), e.g., ambient sensing, is proposed aiming to enhance the way environments and people interact with each other. Specifically speaking, AmI indicates intelligent computing where explicit input and output devices will not be required; instead a variety of sensors, e.g., accelerometers, global positioning system (GPS), microphone, camera, etc., and processors can be embedded into everyday electronic devices, e.g., mobile phones, to collect and process contextual information, using artificial intelligence (AI) techniques, for example, in order to interpret the environment's state and the users' needs.

For example, "Personal Safety" app launched by Google has a feature that can sense if you have been in a car crash and, if so, make an emergency call on your behalf. As another example, AI and machine learning (ML) algorithms (or models) installed in a camera can be capable of recognizing its owner's face, e.g., by determining whether an image captured by the camera matches the facial biometric pattern of the owner's face.

In order for the car crash sensing feature to actually be useful, the mobile phone needs to be able to detect car crashes at all times. For example, whether a car crash happens or not can be determined by continuously polling the accelerometer and the microphone and then processing the data collected thereby, e.g., by performing always-on artificial intelligence (AI). However, the always-on continuous sensing tasks consume a great amount of precious power resources of the mobile phone.

A sensor hub (or a context hub) is a low-power sub-system (e.g., processor) that can be designed to process and interpret the data collected from the sensors, and wake up the main applications processor (AP) to take action. For example, after processing and interpreting the collected data and determining that a car crash has happened, the sensor hub can wake up the AP, and the mobile phone can call for emergency services.

Figure 1:
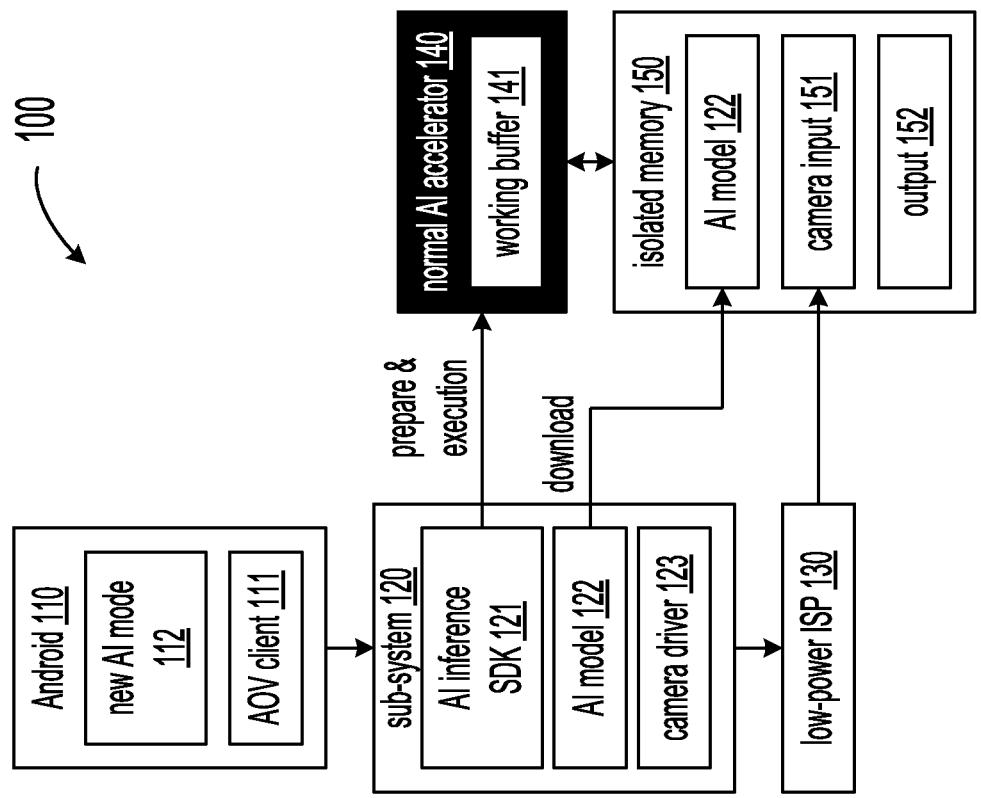
FIG. 1 is a functional block diagram of a first ambient intelligence (AmI)-enabled apparatus.

FIG. 1 is a functional block diagram of an AmI-enabled apparatus 100, e.g., a mobile phone. The apparatus 100 can include an AP 110, a low-power sub-system 120 (e.g., a sensor hub) coupled to the AP 110, a signal processor 130 (e.g., a low-power image signal processor (ISP)) coupled to the sensor hub 120, a processor 140 such as an AI accelerator (such as a deep learning accelerator (DLA), e.g., an accelerated processing unit (APU)) coupled to the sensor hub 120, and a memory 150 coupled to the sensor hub 120, the ISP 130 and the APU 140.

The AP 110 can enable an ambient sensing function, e.g., an always-on vision (AOV) client 111, and load an AI model 122 to the sensor hub 120 to offload the vast processing of data collected from embedded sensors, e.g., a camera (not shown) to the sensor hub 120. In the sensor hub 120, a camera driver 123 can drive, based on the AOV client 111, the ISP 130 to process images (e.g., a user's face) captured by the camera and send the processed images to a camera input 151 of the memory 150. A software development kit (SDK) 121, e.g., an AI inference SDK, can drive the APU 140 to execute the AI model 122 on the processed images. For example, the APU 140 can execute the AI model 122 on the processed imaged transmitted from the camera input 151 with the AI executable binary corresponding to the AI model 122 and generate an output 152, e.g., a classification result, that is associated with whether the captured user's face matches the facial biometric pattern of the owner's face.

In the apparatus 100, the sensor hub 120 can provide secured computing with limited flexibility. For example, the sensor hub 120 can be secured at securing booting stage and fixed functions and security when the mobile phone is running. Ambient sensing keeps on sensing data, which include user privacy, such as voice, vision, around, location, etc. This kind of data, and the AI model 122 loaded into the sensor hub 122 as well, are likely to be attacked, stolen or tampered with if they are not well protected. Besides, the processed images on which the APU 140 executes the AI model 122 may be not captured from the camera, but transmitted by attackers from outside.

A firewall is a network security device that can monitor all incoming and outgoing traffic, and accept, reject or drop the traffic based on a defined set of security rules. For example, a firewall can control network access by monitoring incoming and outgoing packets on any open systems interconnection (OSI) layer, up to the application layer, and allowing them to pass or stop based on source and destination IP address, protocols, ports, and the packets' history in a state table, to protect the packets from being attacked, stolen or tampered with. A firewall can be hardware-based or software-based.

Figure 2:
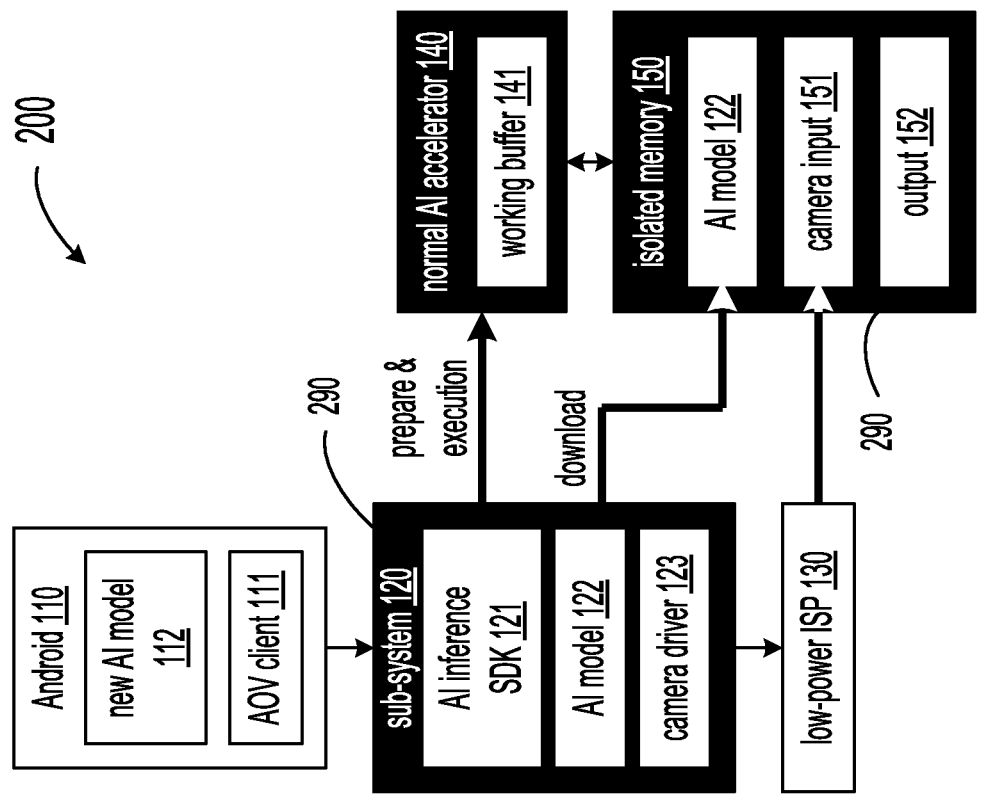
FIG. 2 is a functional block diagram of a second AmI-enabled apparatus.

FIG. 2 is a functional block diagram of an AmI-enabled apparatus 200, e.g., a mobile phone. The apparatus 200 differs from the apparatus 100 in that in the apparatus 200 the sensor hub 120 and the memory 150 are well protected, e.g., via a firewall 290 (shown in black background). Therefore, the sensed data and the AI model 122 are secured, and attackers cannot transmit images into the memory 150. However, the AI model 122 needs to be restored or updated (e.g., with a new AI model 112) from time to time for continuously enhancing the performance or security from device training or Internet. The AP 110 cannot restore or update the AI model 122 stored in the sensor hub 120, as the sensor hub 120 is protected by the firewall 290 and the AP 110 does not have the authority to access the sensor hub 120.

Figure 3:
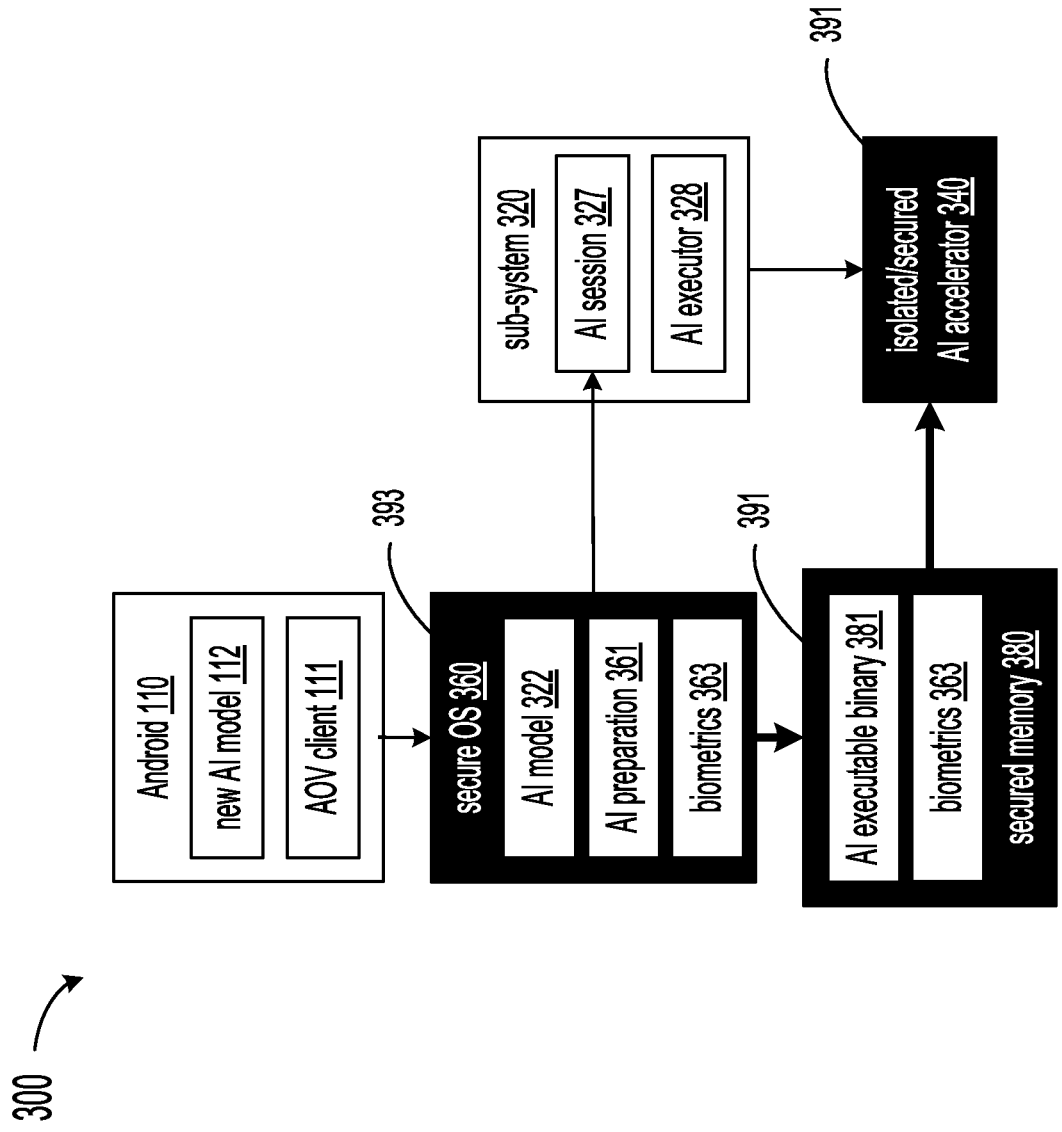
FIG. 3 is a functional block diagram of a third AmI-enabled apparatus.

FIG. 3 is a functional block diagram of an AmI-enabled apparatus 300, e.g., a mobile phone. The apparatus 300 can include a secure operating system (OS) 360. The secure OS 360 can provide a trusted execution environment (TEE) 393 (shown in black background) for Android, where codes and data, e.g., trusted applications (TA), can be protected with respect to confidentiality and integrity. The secure OS 360 can run on the same processor as to where Android runs, e.g., the AP 110, but be isolated by both hardware and software from the rest of the system, which runs a rich OS within a rich execution environment (REE).

An AI model 322 can be loaded within the TEE 393 provided by the secure OS 360, and AI executable binary 381 and a control flow (including an AI session 327 such as the identifier (ID) of the AI model 322, and an AI executor 328) for the AI model 322 (collectively referred to as AI preparation 361) can be prepared. The AI executable binary 381 can be transmitted to a secured memory 380, and the AI session 327 and the AI executor 328 can be transmitted to a low-power sub-system 320, e.g., a sensor hub. A processor 340 such as an AI accelerator (such as a DLA, e.g., an APU) can execute the AI executable binary 381 by determining the AI session 327 and the AI executor 328. In an embodiment, the memory 380 and the APU 340 are also secured (shown in black background), e.g., via a firewall 391, in order to protect the AI executable binary 381 from being attacked, stolen or tampered with. In the example embodiment shown in FIG. 3, the sensor hub 320 is not protected, as it provides only the control flow for the AI model 322, which does not involve any sensed data. In some embodiment, the sensor hub 320 can also be protected, e.g., via a firewall. For example, the firewall may provide a lower security level than the firewall 391, as the AI session 327 and the AI executor 328 are less important than the AI executable binary 381.

In an embodiment, data, e.g., a facial biometric pattern 363, can also be secured within the TEE 393 and downloaded to and stored in the secured memory 380. For example, the APU 340 can execute the AI model 322 on the processed imaged transmitted from the ISP 130 (shown in FIG. 1) (e.g., a user's face) with the AI executable binary 381 and generate an output, e.g., a classification result, that is associated with whether the captured user's face matches the owner's face, i.e., the facial biometric pattern 363.

Due to various implementation of hardware, e.g., the secured memory 380 and the AI accelerator 340 of the apparatus 300, input/output (IO) data and information associated therewith, e.g., the addresses of the IO data, may need to be modified in order to run on the AI model 322, which is deployed to the AI accelerator 340. For example, in a scenario that a plurality of image frames are captured in order to improve performance, a secure camera may include a ring buffer (or a circular buffer) that is configured to serialize the captured image frames. Whenever an image frame is consumed in the ring buffer, the pointers to the start and end of the image frames in the ring buffer are updated and the addresses input to the AI model 322 are changed. As another example, in a scenario that the AI model 322 is used to recognize patterns and includes a plurality of connected subgraphs, e.g., a feature extraction and detection subgraph and a recognition subgraph, the patterns input to and detected by the feature extraction and detection subgraph may be recognized by the recognition subgraph with different, e.g., high or low, resolutions based on their sizes if the APU 340 has limited capability.

Figure 4:
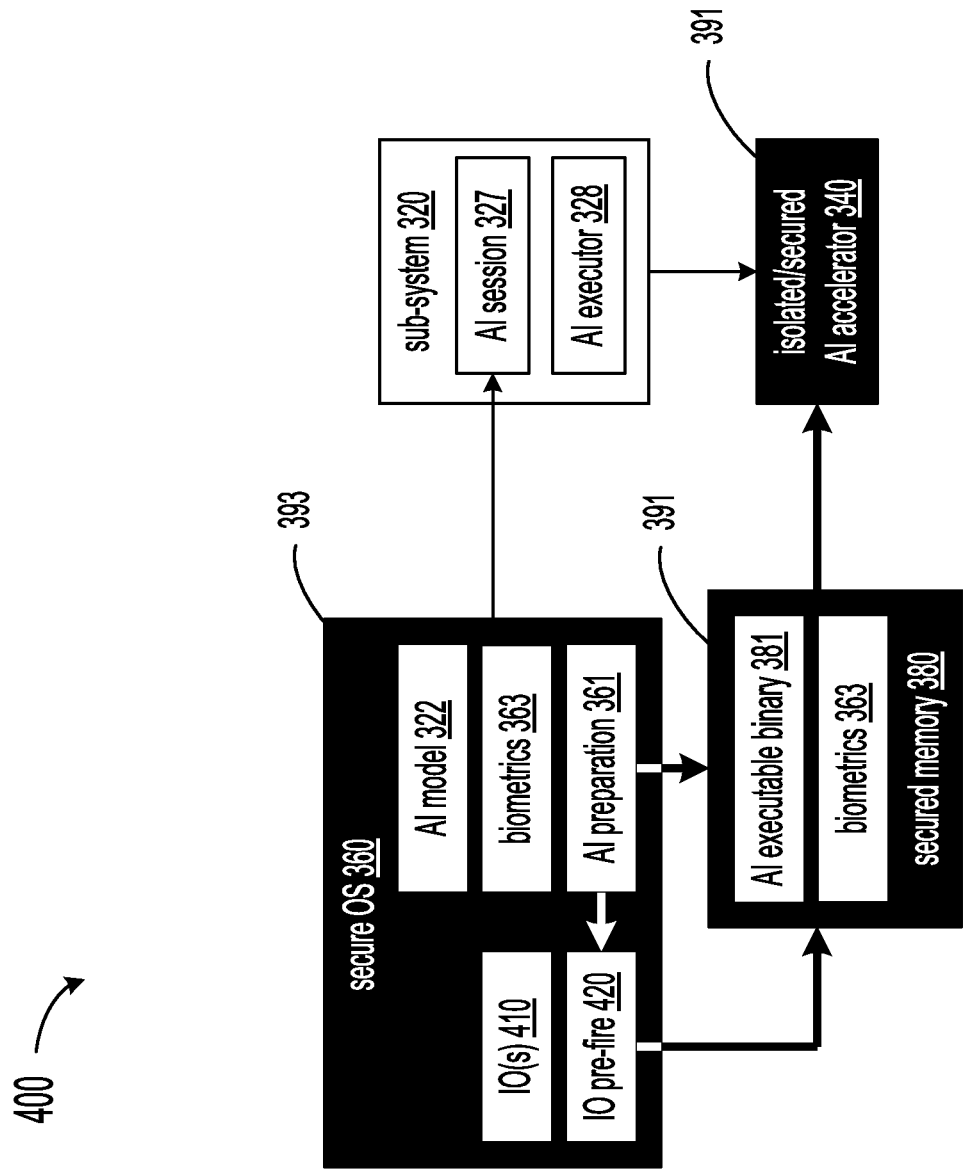
FIG. 4 is a functional block diagram of a fourth AmI-enabled apparatus.
Figure 5:
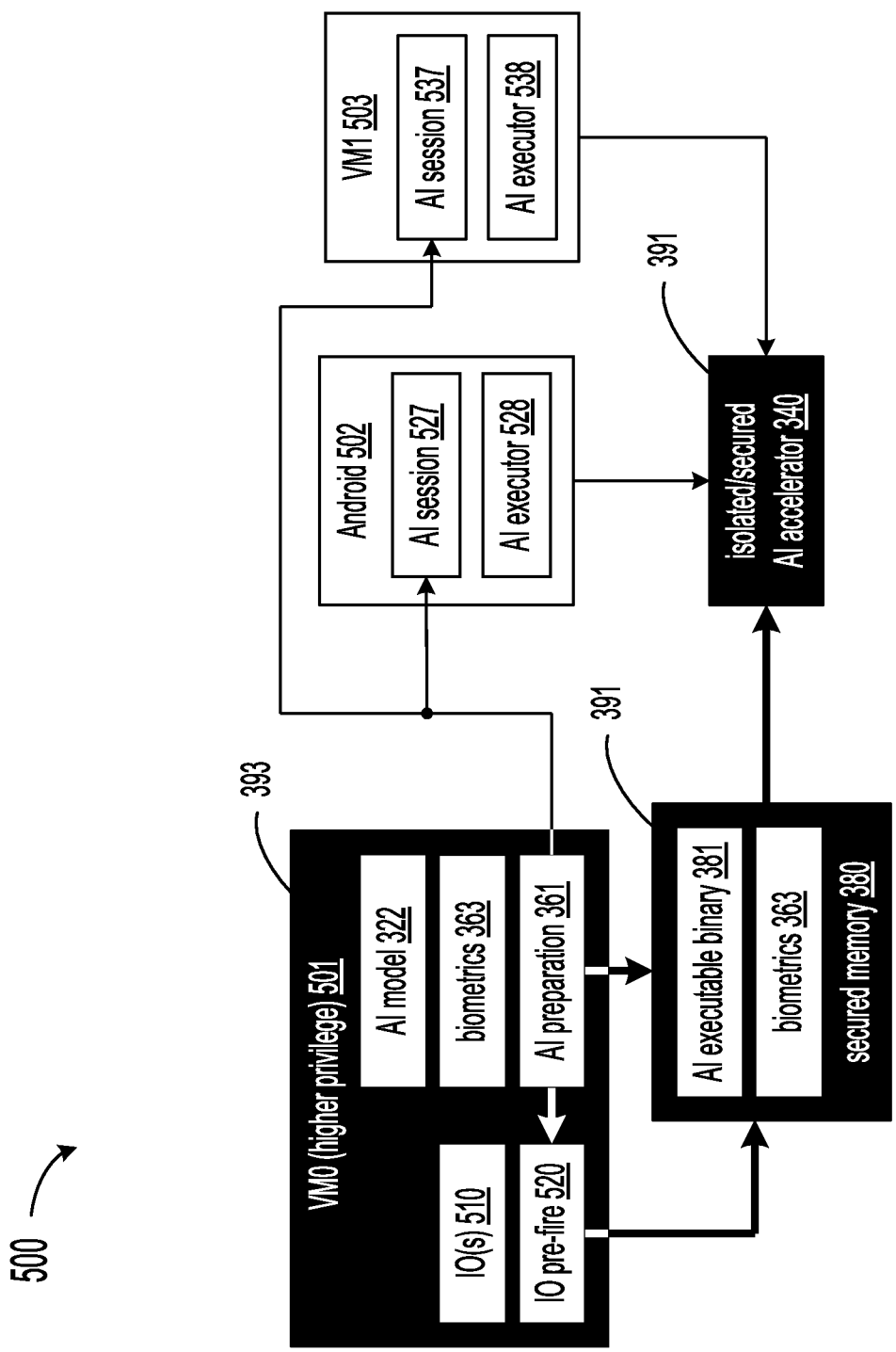
FIG. 5 is a functional block diagram of a fifth AmI-enabled apparatus.

However, when the IO data and/or the information associated therewith are changed, the AI executor 328 cannot modify the AI executable binary 381 as the AI executable binary 381 is protected in the secured memory 380 and in the AI accelerator 340. For example, as shown in an apparatus 400 of FIG. 4, an IO pre-fire module 420 embedded within the TEE 393 provided by the secure OS 360 cannot patch IO changing, e.g., the addresses of the IO(s) 410, to the AI executable binary 381 loaded to the AI accelerator 340, and the AI executor 328 cannot modify the AI executable binary 381. As another example, as shown in an apparatus 500 of FIG. 5, which includes multiple isolated virtual machines (VM), a first VM (VM0) 501 has higher privilege than an Android system 502 and a second VM (VM1) 503, both of which are connected to the AI accelerator 340, an IO pre-fire module 520 embedded within the VM0 501 cannot patch IO changing, e.g., the addresses of IO(s) 510, to the AI executable binary 381 prepared by the VM0 501 and loaded to the AI accelerator 340, and AI executors 528 and 538 of the Android system 502 and the VM1 503 cannot modify the AI executable binary 381.

Figure 6:
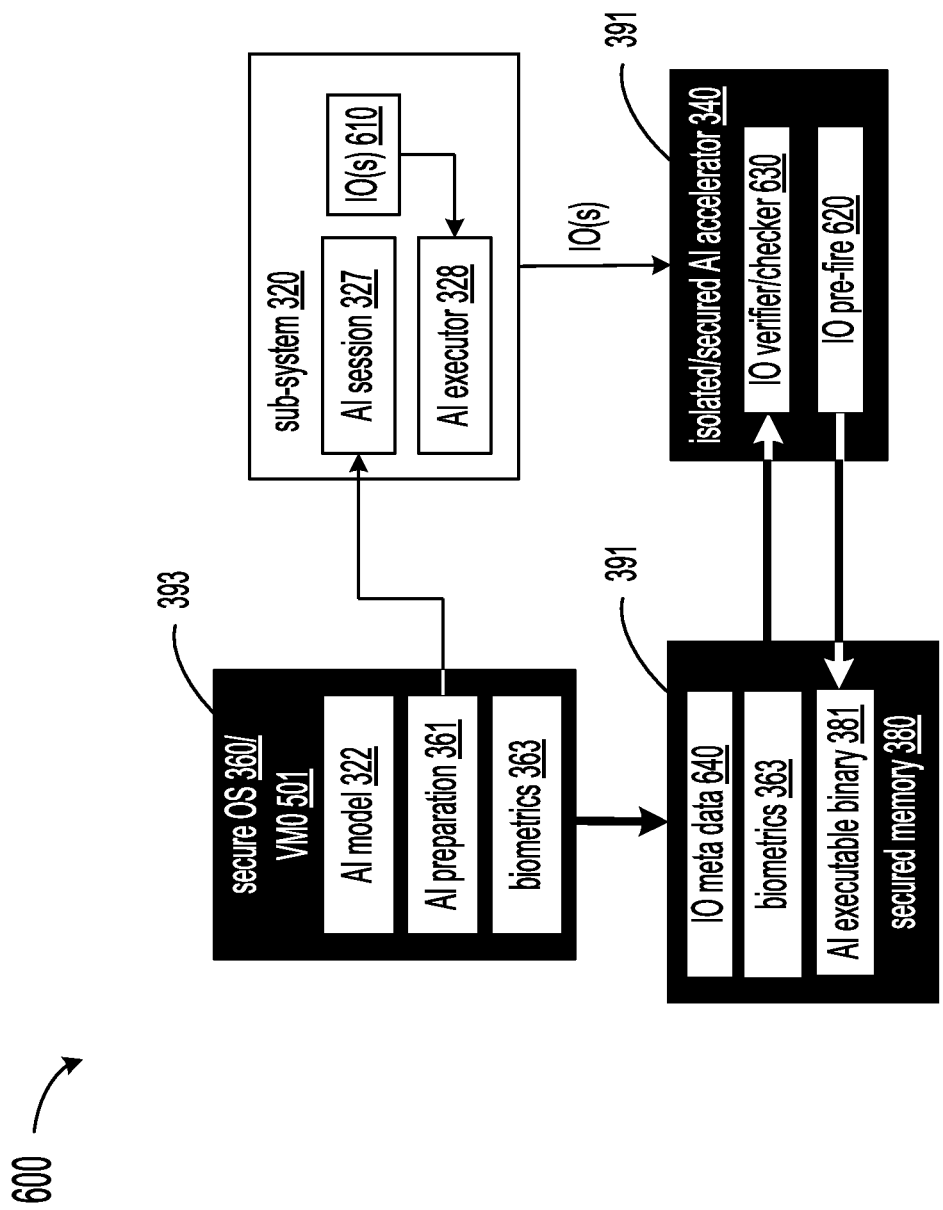
FIG. 6 is a functional block diagram of a first AmI-enabled apparatus according to some embodiments of the present disclosure.

FIG. 6 is a functional block diagram of an AmI-enabled apparatus 600, e.g., a mobile phone, according to some embodiments of the present disclosure. The apparatus 600 can execute an AI model with IO changing. Compared with the apparatus 300, the apparatus 600 can further include IO meta data 640, an IO verifier/checker 630 and an IO pre-fire module 620. In an embodiment, the IO meta data 640 can be provided by the secure OS 360 while the AI executable binary 381 and the control flow (including the AI session 327 and the AI executor 328) for the AI model 322 (collectively referred to as AI preparation 361) are prepared, and be sent to and embedded in the secured memory 380. In the example embodiment of FIG. 6, as the secured memory 380 is protected, e.g., via the firewall 391, the IO meta data 640 can also be protected from being attacked, stolen or tampered with. In another embodiment, the IO verifier/checker 630 and the IO pre-fire module 620 can be embedded in the AI accelerator 340 and be also protected, e.g., via the firewall 391. In an embodiment, the secure OS 360 or a VM (e.g., the VM0 501) can be embedded within the TEE 393. In another embodiment, the sub-system 320 can be a sensor hub or a VM (e.g., the VM1 503). In the example embodiment of FIG. 6, the sub-system 320 is not protected. In some embodiment, the sub-system 320 can also be protected, e.g., via a firewall. For example, the firewall may provide a lower security level than the firewall 391, as the AI session 327 and the AI executor 328 are less important than the AI executable binary 381.

In an embodiment, the IO meta data 640 can include IO address patching information and/or valid/accessible IO (address) ranges. For example, the IO meta data 640 can include pointers (or addresses) to the start and end of the ring buffer of the secure camera. In another embodiment, the IO verifier/checker 630 can verify/check whether IO(s) changing, e.g., IO addresses 610, are within the IO address ranges specified in the IO meta data 640, and the IO pre-fire module 620 can patch the IO addresses 610 to the AI executable binary 381 if the IO addresses 610 are within the IO address ranges. For example, the IO addresses 610 may be provided by malicious entities, e.g., hackers, as the sub-system 320 is not well protected in the example embodiment. In such a scenario, the IO verifier/checker 630 can verify/check the IO addresses 610 and determine that the IO addresses 610 are not within the IO address ranges, and thus the IO pre-fire module 620 will not patch the unverified IO addresses 610 to the AI executable binary 381 that is allocated to and runs on the AI accelerator 340. As another example, when the IO verifier/checker 630 verifies/checks the IO addresses 610 and determines that the IO addresses 610 are within the IO address ranges, the IO pre-fire module 620 can patch the IO addresses 610 to the AI executable binary 381 running on the AI accelerator 340. Therefore, the APU 340 can apply dynamic shape information to the AI executable binary 381 and perform inference.

Figure 7:
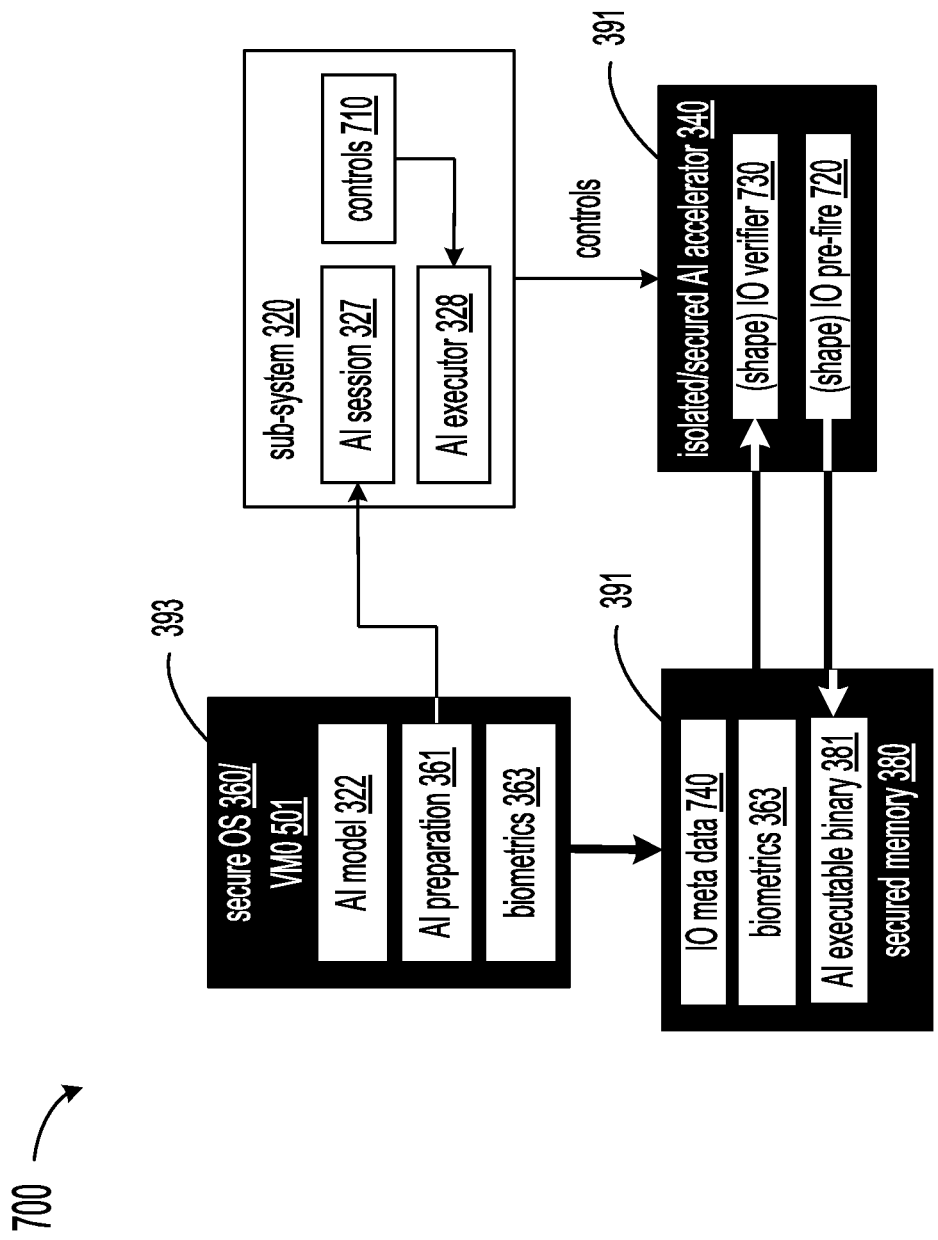
FIG. 7 is a functional block diagram of a second AmI-enabled apparatus according to some embodiments of the present disclosure.

FIG. 7 is a functional block diagram of an AmI-enabled apparatus 700, e.g., a mobile phone, according to some embodiments of the present disclosure. The apparatus 700 can execute an AI model with IO(s) changing. Compared with the apparatus 300, the apparatus 700 can further include IO meta data 740, an (shape) IO verifier 730 and an (shape) IO pre-fire module 720. In an embodiment, the IO meta data 740 can be provided while the AI executable binary 381 is prepared, and sent to and embedded in the secured memory 380. As the secured memory 380 is protected, e.g., via the firewall 391, the IO meta data 740 can also be protected from being attacked, stolen or tampered with. In another embodiment, the (shape) IO verifier 730 and the (shape) IO pre-fire module 720 can be embedded in the AI accelerator 340 and be also protected, e.g., via the firewall 391.

In an embodiment, the IO meta data 740 can include a number of different resolutions, e.g., low and high resolutions. In another embodiment, the (shape) IO verifier 730 can verify whether controls 710 that trigger resolution changing match any one of the different resolutions specified in the IO meta data 740, and the (shape) IO pre-fire module 720 can patch the resolution changing to the AI executable binary 381 if the resolution changing matches any one of the different resolutions specified in the IO meta data 740. For example, the resolution changing may be provided by malicious entities, e.g., hackers, as the sub-system 320 is not well protected in the example embodiment. In such a scenario, the (shape) IO verifier 730 can verify the resolution changing and determine that the resolution changing does not match any one of the different resolutions, and thus the (shape) IO pre-fire module 720 will not patch the unverified resolution changing to the AI executable binary 381 that is allocated to and runs on the AI accelerator 340. As another example, when the (shape) IO verifier 730 verifies the resolution changing and determines that the resolution changing matches one of the different resolutions specified in the IO meta data 740, the (shape) IO pre-fire module 720 can patch the resolution changing to the AI executable binary 381 running on the AI accelerator 340. Therefore, the APU 340 can apply dynamic shape information to the AI executable binary 381 and perform inference.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:
a first secured processor;
a secured application embedded in the first secured processor, the secured application associated with an artificial intelligence (AI) model;
a secured memory coupled to the first secured processor, the secured memory configured to store an AI executable binary that is associated with the AI model, wherein the secured memory is protected by a first firewall;
a second secured processor coupled to the secured memory, the second secured processor configured to execute the AI executable binary stored in the secured memory, wherein the second secured processor is protected by the first firewall;
a sub-system coupled between the first secured processor and the second secured processor, the sub-system configured to process Input/Output (IO) data and trigger the second secured processor to execute the AI executable binary stored in the secured memory when there is a change in the IO;
IO meta data stored in the secured memory;
an IO verifier embedded in the second secured processor, the IO verifier configured to verify the IO changes by comparing the IO changes with the IO meta data; and
an IO pre-fire module coupled to the IO verifier and embedded in the second secured processor, the IO pre-fire module configured to patch the IO changes to the AI executable binary running on the second secured processor when the IO verifier determines that the IO changes matches the IO meta data;
wherein the first secured processor and the sub-system are not protected by the first firewall, the first secured processor is separate from the second secured processor, and the sub-system is not embedded in the first secured processor, the second secured processor or the secured memory.

2. The apparatus of claim 1, wherein the IO meta data include an IO address range, the IO changes includes an IO address, the IO verifier verifies whether the IO address is within the IO address range, and the IO pre-fire module patches the IO address to the AI executable binary running on the second secured processor when the IO verifier determines that the IO address is within the IO address range.

3. The apparatus of claim 1, wherein the IO meta data include a number of different resolutions, the IO changes includes resolution changing, the IO verifier verifies whether the resolution changing matches any one of the different resolutions specified in the IO meta data, and the IO pre-fire module patches the resolution changing to the AI executable binary running on the second secured processor when the IO verifier determines that the resolution changing matches one of the different resolutions.

4. The apparatus of claim 1, further comprising a secure operating system (OS) embedded in the first secured processor, the secure OS configured to provide a trusted execution environment (TEE) within which the secured application is protected.

5. The apparatus of claim 4, further comprising:
an image signal processor (ISP) coupled to the secured memory, the ISP configured to process images and store the processed images into the secured memory, and
a facial biometric pattern secured within the TEE,
wherein the second secured processor executes the AI executable binary to determine whether any one of the processed images matches the facial biometric pattern.

6. The apparatus of claim 1, wherein the sub-system is protected by a second firewall different from the first firewall.

7. The apparatus of claim 6, wherein the first firewall provides a higher security level than the second firewall.

8. The apparatus of claim 1, wherein the first secured processor includes a secured central processing unit (CPU).

9. The apparatus of claim 1, wherein the second secured processor includes a secured deep learning accelerator (DLA).

10. The apparatus of claim 9, wherein the DLA includes an accelerated processing unit (APU).

* * * * *